United States Patent [19]

Carpenter

[11] Patent Number: 4,726,508
[45] Date of Patent: Feb. 23, 1988

[54] METHOD OF BRAZING CORROSION RESISTANT NICKEL-BASED THIN-WALLED TUBING TO STAINLESS STEEL BASE MEMBERS

[75] Inventor: Brent L. Carpenter, Boulder, Colo.
[73] Assignee: Micro Motion, Inc., Boulder, Colo.
[21] Appl. No.: 888,544
[22] Filed: Jul. 21, 1986
[51] Int. Cl.[4] .................. B23K 35/30; B23K 31/02
[52] U.S. Cl. ..................... 228/263.13; 228/263.16; 420/508; 420/512
[58] Field of Search ............... 228/263.15, 263.13, 228/263.16, 231, 246; 420/508, 512

[56] References Cited

U.S. PATENT DOCUMENTS

| | | | |
|---|---|---|---|
| 4,274,908 | 6/1981 | Fishter et al. | 156/637 |
| 4,405,391 | 9/1983 | DeCristofaro | 148/403 |
| 4,508,257 | 4/1985 | Bose et al. | 228/263.13 |
| 4,556,240 | 12/1985 | Yoshida | 228/263.13 |
| 4,604,328 | 8/1986 | Mizahara | 228/263.11 |

FOREIGN PATENT DOCUMENTS 2092692  8/1982  United Kingdom ............... 228/246

OTHER PUBLICATIONS

Metals Handbook, 8th edition, vol. 2, pp. 257-268, 1964.

Primary Examiner—Nicholas P. Godici
Assistant Examiner—Samuel M. Heinrich
Attorney, Agent, or Firm—John Victor Pezdek; William D. Palmer

[57] ABSTRACT

A method of brazing corrosion resistant, nickel-based, thin-walled tubing which includes substantial proportions of nickel, chromium and molybdenum to a stainless steel base member using a filler metal, principally comprising gold as a major constituent and nickel as a minor constituent, in a vacuum furnace without introducing stress corrosion cracks in the brazed tubing and also avoiding carbon precipitation. The brazing is conducted at a temperature of at least about 1900° F. (1038° C.) for a sufficient period of time to allow any carbide precipitation formed during the heating to redissolve and also to permit full, uniform flow of the filler metal. The heated members are rapidly quenched in an inert atmosphere to a temperature at least sufficiently low to avoid carbon precipitation in the tubing.

11 Claims, 3 Drawing Figures

METHOD OF BRAZING CORROSION RESISTANT NICKEL-BASED THIN-WALLED TUBING TO STAINLESS STEEL BASE MEMBERS

FIELD OF THE INVENTION

This invention relates to brazing of corrosion resistant, nickel-based, thin-walled tubing to stainless steel base members and, more particularly, to a method for making such brazements for use in fabricating Coriolis mass flow meters for application in corrosive conditions.

BACKGROUND OF THE INVENTION

Coriolis mass flow meters are well known in the art and are generally described in the following U.S. Pat. No. Re. 31,450, dated Nov. 29, 1983 to Smith and entitled "Method and Structure for Flow Measurement;" U.S. Pat. No. 4,422,338 dated Dec. 27, 1983 to Smith and entitled "Method and Apparatus for Flow Measurement;" and U.S. Pat. No. 4,491,025, dated Jan. 1, 1985 to Smith et. al. and entitled "Parallel Path Coriolis Mass Flow Rate Meter,"; all owned by the present assignee. Such flow meters normally utilize a continuously curved conduit or tube through which the fluid to be measured flows. Oscillation of the tube during flow of the fluid generate a Coriolis force couple which is a function of the mass of the fluid flow rate through the tube.

In order to measure corrosive materials such as HCl solutions, it is desirable to fabricate the tubing of "Hastelloy" Alloy C, which is a trademark of the Cabot Corporation of Kokomo, Ind. This is a well-known, nickel-based alloy for use in equipment for handling corrosive materials. Such materials have been used in the form of tubing in flow meters and have been torch brazed to stainless steel base members using filler metal alloys of Ag-Cu-Zn. It has been found that the brazements formed by this method have sometimes failed when subjected to tensile stress and the corrosive interaction of the filler metal used in the brazement. In some cases, apparently the thermal stresses resulting from torch brazing have proved sufficient to cause stress corrosion cracking of the tubing by the filler metal.

In metallographic studies, carbide precipitation has been observed in "Hastelloy C-276" samples when the brazing temperatures fell within the range of 1380° F. to 1820° F. (748° C. to 995° C). This is undesirable because it reduces corrosion resistance of the alloy. Apparently, such carbide precipitation occurs at a relatively fast rate. Because of the relatively fast rate of carbide formation, it was found that use of conventionally used brazing filler metals is impractical within this temperature range.

If the "Hastelloy" tubing has a relative large wall thickness, such as greater than about 15 mils (0.38 mm), satisfactory brazements can be obtained using filler metals which contain large proportions of boron, provided the thermal stresses can be eliminated. It has been found, however, that boron tends to diffuse into the "Hastelloy" so that thin walled tubing having a wall thickness less than about 12 mils (0.3 mm) cannot be satisfactorily brazed with a boron containing filler metal.

SUMMARY OF THE INVENTION

There is provided a method of brazing corrosion resistant, nickel-based, thin-walled tubing which includes substantial proportions of nickel, chromium and molybdenum to a stainless steel base member without introducing stress corrosion cracks in the brazed tubing and also avoiding carbon precipitation in the brazed tubing. The tubing and base member are retained in adjacent positions desired and a filler metal, principally comprising gold as a major constituent and nickel as a minor constituent, is positioned proximate the adjacent portions of the members to be brazed. The brazement is effected in a vacuum furnace to provide even heating with the vacuum operating to remove and prevent formation of oxides and aiding the uniform flow of the filler metal between and onto the tubing and base member. The brazing is conducted at a temperature of at least about 1900° F. (1038° C.) for a sufficient period of time to allow any carbide precipitation formed during the heating to redissolve and also to permit full, uniform flow of the filler metal. Thereafter, the retained and heated members are rapidly quenched in an inert atmosphere to a temperature at least sufficiently low to avoid carbon precipitation in the tubing.

BRIEF DESCRIPTION OF THE DRAWINGS

For a better understanding of the invention, reference should be had to the accompanying drawings wherein.

DETAILED DESCRIPTION

Figure 1:
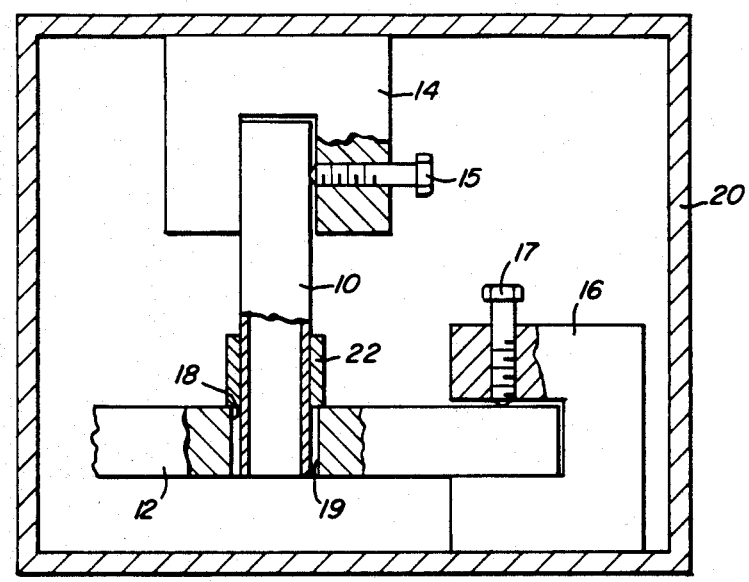
FIG. 1 is an elevational view, shown partly in section, of the members to be brazed retained in adjacent positions in a vacuum furnace, with the filler metal positioned proximate the adjacent portions of the retained members.

With specific reference to the form of the invention illustrated in the drawings, in FIG. 1 are shown the thin-wall tubing 10 and the stainless steel base member 12, respectively, retained in an adjacent relationship by retaining member 14 and setscrew 15 and retaining member 16 and setscrew 17. The tubing 10 is positioned within an opening 18 provided in the base member 12 and for the specific example considered herein, the clearance between the outer diameter of the tubing 10 and the wall 19 of the opening 18 is about 5 mils (0.13 mm). Of course, this spacing dimension can be varied. All of these members are supported in a vacuum furnace 20 (shown schematically). The furnace 20 permits an even heating of the members to be brazed thereby eliminating thermal stresses and the retention of these members also minimizes any tendency for mechanical stresses. The furnace is also adapted to be flushed with inert gas for temperature quenching purposes. The filler metal 22 has a toroidal configuration with an approximately rectangular cross section and is positioned proximate the region of adjacency of the members 10 and 12. Preferably, the filler metal 22 is also positioned above the region of adjacency of the members 10 and 12 so that during brazing the filler metal 22 will flow downwardly between the adjacent portions of the members 10 and 12.

As a specific example, the tube 10 has a wall thickness of 8 mils (0.2 mm) and is formed of "Hastelloy" C-276 which has the following nominal weight percent composition:

| Ni | Co | Cr | Mo | W | Fe |
|---|---|---|---|---|---|
| Bal. | 2.5* | 15.5 | 16.0 | 4.0 | 5.5 |
| Si | Mn | C | S | P | V |
| .08* | 1.0* | .01* | .01* | .025* | .035* |

*Maximum
Bal. = Balance

The outer diameter of the tube 10 is about 120 mils (3.05 mm). The stainless steel base member has a thickness of about ⅛ inch (3.2 mm) and is formed of stainless steel No. 316L which has the following nominal weight percent composition:

| C | Si | Mn | P | S | Ni | Cr | Mo |
|---|---|---|---|---|---|---|---|
| .03* | 1.0* | 2.0* | .04* | .03* | 10.0–15.0 | 16.0–18.0 | 2.0–3.0 |

*Maximum

The filler metal 22 is an 82Au-18Ni alloy. Of course, other "Hastelloy" alloys may be substituted for the foregoing specific example and other stainless steels such as nos. 303, 304, 304L, 316 and 321 may be substituted for the foregoing example.

To effect the brazement, the furnace 20 and members to be brazed are heated to a temperature preferably within the range of from about 1900° F. (1038° C.) to about 2230° F. (1221° C.), a specific example being a peak temperature of 2180° F. (1193° C.) maintained for about 60 seconds. During the heating stage, some precipitation of carbides will have occurred in the tubing 10 and heating to this indicated temperature will cause the carbides to redissolve. In addition, the filler metal 22 will have had a full and uniform flow into the opening 18 and between the adjacent portions of the members 10 and 12. Normally, the surface tension of the molten filler metal will limit flow to fill the opening 18.

Figure 2:
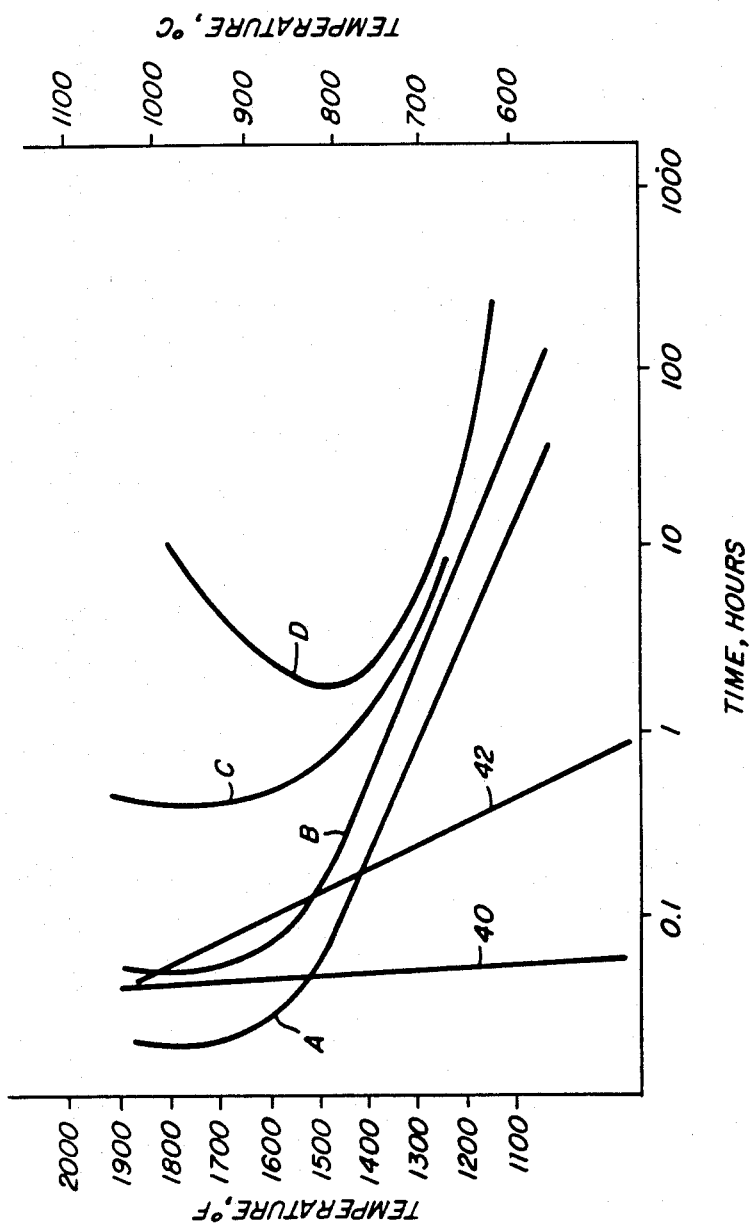
FIG. 2 is a temperature-time diagram showing the beginning of carbide precipitation in Ni, Cr, Mo, corrosion-resistant alloys.

The temperature-time relationships needed to avoid carbide precipitation in the tubing 10 are shown in FIG. 2. For curves A through D of FIG. 2, the alloys have the nominal weight percent compositions set forth in Table 1.

TABLE 1

| Curve | A | B | C | D |
|---|---|---|---|---|
| Hastelloy Designation | C | C276 | C22 | C4 |
| Alloy Composition | | | | |
| Ni | Bal. | Bal. | Bal. | Bal. |
| Co | 2.5* | 2.5* | 2.5* | 2.0* |
| Cr | 14.5–16.5 | 15.5 | 20.0–22.5 | 16.0 |
| Mo | 15.0–17.0 | 16.0 | 12.5–14.5 | 15.5 |
| W | 3.0–4.5 | 4.0 | 2.5–3.5 | — |
| Fe | 4.0–7.0* | 5.5 | 2.0–6.0 | 3.0* |
| Si | 1.0* | .08* | .08* | .08* |
| Mn | 1.0* | 1.0* | .50* | 1.0* |
| C | .08* | .01* | .01* | .01* |
| Ti | — | — | — | .70* |
| S | .03 | .01* | .01* | .01* |
| P | .04 | .25* | .25* | .25* |
| V | .35* | .35* | .35* | — |

*Maximum
Bal. = Balance

In general, for each curve, carbide precipitate will occur if the quenching rate is allowed to pass through the region to the right of and above the curve. As an example, when the tubing 10 is formed of Alloy C-276 and the brazing temperature is at 1900° F. (1038° C.), to avoid carbide precipitation in the tubing 10 during cooling, the heated tubing is quenched in an inert atmosphere to a temperature of 1400° F. (760° C.) in about four minutes. This is shown by line 40 on FIG. 2. This avoids the "nose" of curve "B". Line 42 represents a quenching rate that will fall within the carbide precipitation region for curve "B". Argon, nitrogen, helium, and mixtures thereof are all suitable gases for providing the inert atmosphere. Other gases which are non-reactive with respect to the brazed components can be used.

Figure 3:
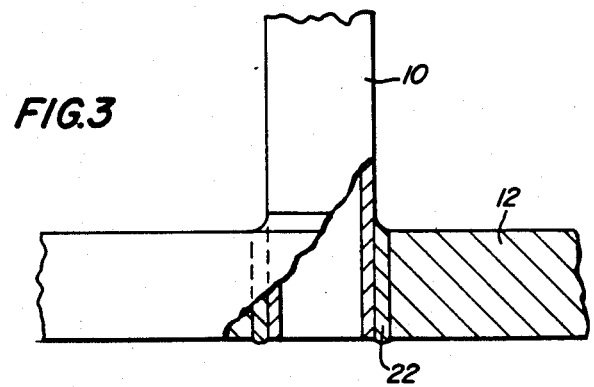
FIG. 3 is an elevational view, partly in section, showing the brazed tubing and base member.

The finished brazed member is shown in FIG. 3 wherein the tubing 10 is brazed to the stainless steel base member 12 with the flowed filler metal 22 forming a stress-free and crack-free brazement. Also, it is important to note that the brazement is essentially free of voids or pinholes. When used in a mass flow meter such as the type described in aforementioned U.S. Pat. No. Re. 31,450, dated Nov. 29, 1983 and entitled "Method and Structure for Flow Measurement," and aforementioned U.S. Pat. No. 4,491,025, dated Jan. 1, 1985 and entitled "Parallel Path Coriolis Mass Flow Rate Meter," the tube is vibrated during operation of the flow meter. Voids or pinholes in the brazement can cause a stress riser to occur in the region of the void. This localized increase in stress can then lead to crack propagation and possible failure of the brazement.

Gold and nickel are mutually soluble in each other to a large degree. As nickel from the tube 10 is picked up by the Au-Ni alloy forming the filler metal 22, the remelt temperature will increase. As a result, penetration of the filler metal into the "Hastelloy" tubing will cease when the melt temperature of the filler metal 22 exceeds the furnace temperature, i.e., the Au-Ni solidus is exceeded. The flow point for the 82Au-18Ni alloy is 1740° F. (946° C.). To minimize penetration, the alloy may be modified slightly by inclusion of a small amount of palladium. For example, a 70Au-22Ni-8Pd alloy has a flow point of 1915° F. (1046° C.). Use of such a filler metal would require a minimum furnace termperature greater than the flow point of the 70Au-22Ni-8Pd alloy. In general, the paramenters for effecting a brazement with this filler metal are a furnace temperature from about 2140° F. (1171° C.) to about 2230° F. (1221° C.) maintained for about 1 to about 8 minutes.

In general, the brazing temperature should be in excess of the flow point of the filler metal. Also, the time at which the members are held at the brazing temperature must be sufficient to allow the carbides that formed during heating to redissolve and to allow for the full uniform flow of the filler metal. Additionally, the upper limit on the time at which the members are held at the brazing temperature is chosen to limit excessive filler metal/parent metal interactions. As used here, parent metal refers to the metal of the tubing member. Thus, carbide solution rates, carbide precipitation rates and filler metal/parent metal interaction rates determine a time and temperature window in which the present brazing method will produce an essentially stress-free and crack-free brazement. As a general rule, the parameters for effecting a brazement are a furnace temperature from about 1900° F. (1038° C.) to about 2230° F. (1221° C.) maintained for less than about 8 minutes in order to prevent excessive filler metal/parent metal interactions. While alloy C-276 is presently the preferred "Hastelloy" material, alloys C-22 and C-4 have excellent possibilities. As can be seen from the curves "C" and "D", alloys C-22 and C-4 permit a longer quench time thus expanding the time and temperature window previously discussed. Other filler metals containing various degrees of Au-Ni-Pd also show some promise. For example, a 50Au-25Ni-25Pd filler metal can be used within the temperature ranges given for the 70Au-22Ni-8Pd filler metal.

The embodiments given here are exemplary only and should not be interpreted in a limiting sense. Other embodiments of the invention will be apparent to those skilled in the art from a consideration of this specification or practice of the invention disclosed herein. It is intended that the specification be considered as exemplary only with the true scope and spirit of the invention being indicated by the following claims.

I claim:

1. The method of brazing corrosion resistant, nickel-based, thin-walled tubing which includes substantial proportions of nickel, chromium and molybdenum with an iron content limited to a maximum of 7 percent by weight to a stainless steel base member without introducing stress corrosion cracks in the tubing and also avoiding carbon precipitation in the brazed corrosion resistant tubing, which method comprises:

retaining said tubing and said base member to be brazed in adjacent positions desired for the brazed product and positioning a filler metal principally comprising gold as a major constituent and nickel as a minor constituent proximate the adjacent portions of said tubing and said base member;

evenly heating said tubing and said base member and said filler metal under vacuum conditions to a temperature of at least about 1900° F. for a sufficient period of time to avoid excessive reaction between said filler metal and said parts being brazed and to allow any carbide precipitate formed during heating to redissolve and to permit full uniform flow of said filler metal between said tubing and said base member; and rapidly quenching said retained and heated members in a gaseous atmosphere which is non-reactive with respect to said retained and heated members to a temperature at least sufficiently low to avoid carbide precipitation in said tubing.

2. The method as specified in claim 1, wherein said filler metal also includes a predetermined small proportion of palladium, and said even heating temperature is sufficient to cause said filler metal to evenly flow.

3. The method as specified in claim 1, wherein said tubing has a wall thickness of less than about 12 mils.

4. The method as specified in claim 1, wherein said rapid quenching is to a temperature of less than about 1400° F. and said rapid quenching is conducted under nonreactive conditions.

5. The method as specified in claim 1, wherein prior to heating said filler metal is positioned proximate to and also above the adjacent portions of said tubing and said base member.

6. The method as specified in claim 1, wherein said filler metal consists essentially of 82 weight percent gold and 18 weight percent nickel.

7. The method as specified in claim 1, wherein said filler metal consists essentially of 70 weight percent gold, 22 weight percent nickel and 8 weight percent palladium.

8. The method as specified in claim 1, wherein said filler metal consists essentially of 50 weight percent gold, 25 weight percent nickel and 25 weight percent palladium.

9. The method as specified in claim 1, wherein said retained tubing and said base member and said filler metal are heated to a temperature of from about 1900° F. to about 2230° F.

10. The method as specified in claim 9, wherein said even heating within said temperature of from about 1900° F. to about 2230° F. does not exceed about 8 minutes to avoid excessive reaction between said filler metal and said parts being brazed.

11. The method of brazing corrosion resistant, nickel-based, thin-walled tubing having a wall thickness of less than about 12 mils and which includes substantial proportions of nickel, chromium and molybdenum with an iron content limited to a maximum of 7 percent by weight to a stainless steel base member without introducing stress corrosion cracks in the tubing and also avoiding carbon precipitation in the brazed corrosion resistant tubing, which method comprises:

retaining said tubing and said base member to be brazed in adjacent positions desired for the brazed product and positioning a filler metal principally comprising gold as a major constituent and nickel as a minor constituent proximate the adjacent portion of said tubing and said base member;

evenly heating said tubing and said base member and said filler metal under vacuum conditions to a temperature of at least about 1900° F. for a sufficient period of time not exceeding about 8 minutes to avoid excessive reaction between said filler metal and said parts being brazed and to allow any carbide precipitate formed during heating to redissolve and to permit full uniform flow of said filler metal between said tubing and said base member; and rapidly quenching said retained and heated members in a gaseous atmosphere which is non-reactive with respect to said retained and heated members to a temperature of less than about 1400° F. to avoid carbide precipitation in said tubing.

* * * * *